US008190895B2

(12) United States Patent
Lauter et al.

(10) Patent No.: US 8,190,895 B2
(45) Date of Patent: May 29, 2012

(54) AUTHENTICATED KEY EXCHANGE WITH DERIVED EPHEMERAL KEYS

(75) Inventors: Kristin E. Lauter, La Jolla, CA (US); Brian A. LaMacchia, Bellevue, WA (US); Anton Mityagin, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 1744 days.

(21) Appl. No.: 11/207,686

(22) Filed: Aug. 18, 2005

(65) Prior Publication Data
US 2007/0055880 A1  Mar. 8, 2007

(51) Int. Cl.
*H04L 29/06* (2006.01)
(52) U.S. Cl. ............................ 713/171; 380/277
(58) Field of Classification Search .................. 713/150, 713/168, 171, 176; 726/3; 380/47, 44, 277, 380/283
See application file for complete search history.

(56) References Cited

U.S. PATENT DOCUMENTS

| 6,122,736 | A * | 9/2000 | Vanstone et al. .............. 713/169 |
| 6,226,383 | B1 | 5/2001 | Jablon |
| 6,487,661 | B2 | 11/2002 | Vanstone et al. |
| 6,539,479 | B1 | 3/2003 | Wu |
| 6,718,467 | B1 | 4/2004 | Trostle |
| 6,993,651 | B2 | 1/2006 | Wray et al. |
| 7,159,116 | B2 | 1/2007 | Moskowitz |
| 7,490,239 | B2 | 2/2009 | Beeson |
| 2002/0062451 | A1 | 5/2002 | Scheidt et al. |
| 2002/0090085 | A1 | 7/2002 | Vanstone et al. |
| 2003/0081785 | A1 | 5/2003 | Boneh et al. |
| 2003/0123655 | A1 | 7/2003 | Lambert et al. |
| 2004/0081321 | A1 | 4/2004 | Struik |
| 2005/0066175 | A1 | 3/2005 | Perlman |
| 2006/0093138 | A1 | 5/2006 | Durand et al. |
| 2007/0028106 | A1 * | 2/2007 | Lauter et al. .................. 713/171 |
| 2007/0033403 | A1 * | 2/2007 | Lauter et al. .................. 713/171 |
| 2007/0043946 | A1 | 2/2007 | Lauter et al. |

OTHER PUBLICATIONS

Boyd et al., "Elliptical Curve Based Password Authenticated Key Exchange Protocols", ACISP 2001, LNCS 2119, Springer-Verlag Berlin Heidelberg 2001, 2001, pp. 487-501.
Canetti et al.,"Analysis of Key-Exchange Protocols and Their Use for Building Secure Channels", Proceedings of the International Conference on the Theory and Application of Cryptographic Techniques, LNCS, Springer-Verlag, vol. 2045, 2001, pp. 451-474.
Shin et al., "Leakage-Resilient Authenticated Key Establishment Protocols", Advances in Cryptology ASIACRYPT, LNCS 2894, Springer Berlin/Heidelberg, 2003, pp. 155-173.
Vanstone, "Key Argument and Transport Protocol", PCT/CA 03/00317, Mar. 8, 2002.
Law et al. "An Efficient Protocol for Authenticated Key Agreement"; Technical Report CORR 98-05, Dept. of C&O, University Waterloo, Canada, 1998; pp. 1-16.

* cited by examiner

*Primary Examiner* — Hadi Armouche
(74) *Attorney, Agent, or Firm* — Lee & Hayes, PLLC

(57) ABSTRACT

AKE with derived ephemeral keys is described. In one aspect, a first party computes a derived ephemeral public-key based on a derived ephemeral secret key and a mathematical group. The derived ephemeral secret key is based on an ephemeral secret key and a long-term secret key. The first party generates a session key for secure exchange of information with a second party. The session key is generated using the derived ephemeral secret key and a second party derived ephemeral public-key key to demonstrate to the second party that the first party possesses the long-term secret key.

20 Claims, 4 Drawing Sheets

AUTHENTICATED KEY EXCHANGE WITH DERIVED EPHEMERAL KEYS

BACKGROUND

Many standards documents governing the use of public key cryptography include specifications for Authenticated Key Exchange (AKE). AKE protocols involve two parties, an initiator and a responder. The goal of AKE is to allow the two parties to generate a secret session key, while authenticating the identities of the parties, so that the two parties can securely exchange information over a public channel with one another. AKE protocols such as Menezes-Qu-Vanstone (MQV) and an elliptic curve (EC) analogue (ECMQV) have recently been introduced. MQV and ECMQV are based on the well-known Diffie-Hellman key exchange protocol. The Diffie-Hellman key exchange protocol relies on the hardness of computing the discrete logarithm in a mathematical group. That is, if one takes an arbitrary number g known to everyone, picks an exponent, raises g to the power of this exponent, and announces the result, it becomes computationally infeasible for someone to determine which exponent was used.

Recent research has shown that the KEA, MQV, and ECMQV protocols are not secure against certain classes of attacks such as impersonation attacks.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In view of the above, AKE with derived ephemeral keys is described. In one aspect, a first party computes a derived ephemeral public-key based on a derived ephemeral secret key and a mathematical group. The derived ephemeral secret key is based on an ephemeral secret key and a long-term secret key. The first party generates a session key for secure exchange of information with a second party. The session key is generated using the derived ephemeral secret key and a second party derived ephemeral public-key key to demonstrate to the second party that the first party possesses the long-term secret key.

BRIEF DESCRIPTION OF THE DRAWINGS

In the Figures, the left-most digit of a component reference number identifies the particular Figure in which the component first appears.

DETAILED DESCRIPTION

Overview

AKE with derived ephemeral keys protocols KEA++ and EC-KEA++ provide extensions to existing Diffie-Hellman based AKE protocols. More particularly, KEA++ provides for AKE with derived ephemeral keys using a multiplicative group of a prime field. EC-KEA++ provides for AKE with derived ephemeral keys using a group of points on an elliptic curve of prime order. KEA++ and EC-KEA++ are different from conventional AKE protocols in that KEA++ and EC-KEA++ require a party to compute a derived ephemeral secret key from a hash of a random value and the party's long-term secret key. The random value is selected from the multiplicative group and the group of points. A derived ephemeral public-key is generated from the derived ephemeral secret key. The derived ephemeral public keys are exchanged between parties of the AKE session and used, along with authenticated party identities, to generate respective session keys. This means that each party has to demonstrate possession of its long-term secret key to compute active session keys. This achieves provable security against impersonation attacks under the strongest adversarial model.

The following sections describe these and other aspects of AKE with derived ephemeral keys protocols (KEA++ and EC-KEA++) in greater-detail.

An Exemplary System

Although not required, AKE with derived ephemeral keys is described in the general context of computer-program instructions being executed by a computing device such as a personal computer. Program modules generally include routines, programs, objects, components, data structures, etc., that perform particular tasks or implement particular abstract data types. While the systems and methods are described in the foregoing context, acts and operations described hereinafter may also be implemented in hardware.

Figure 1:
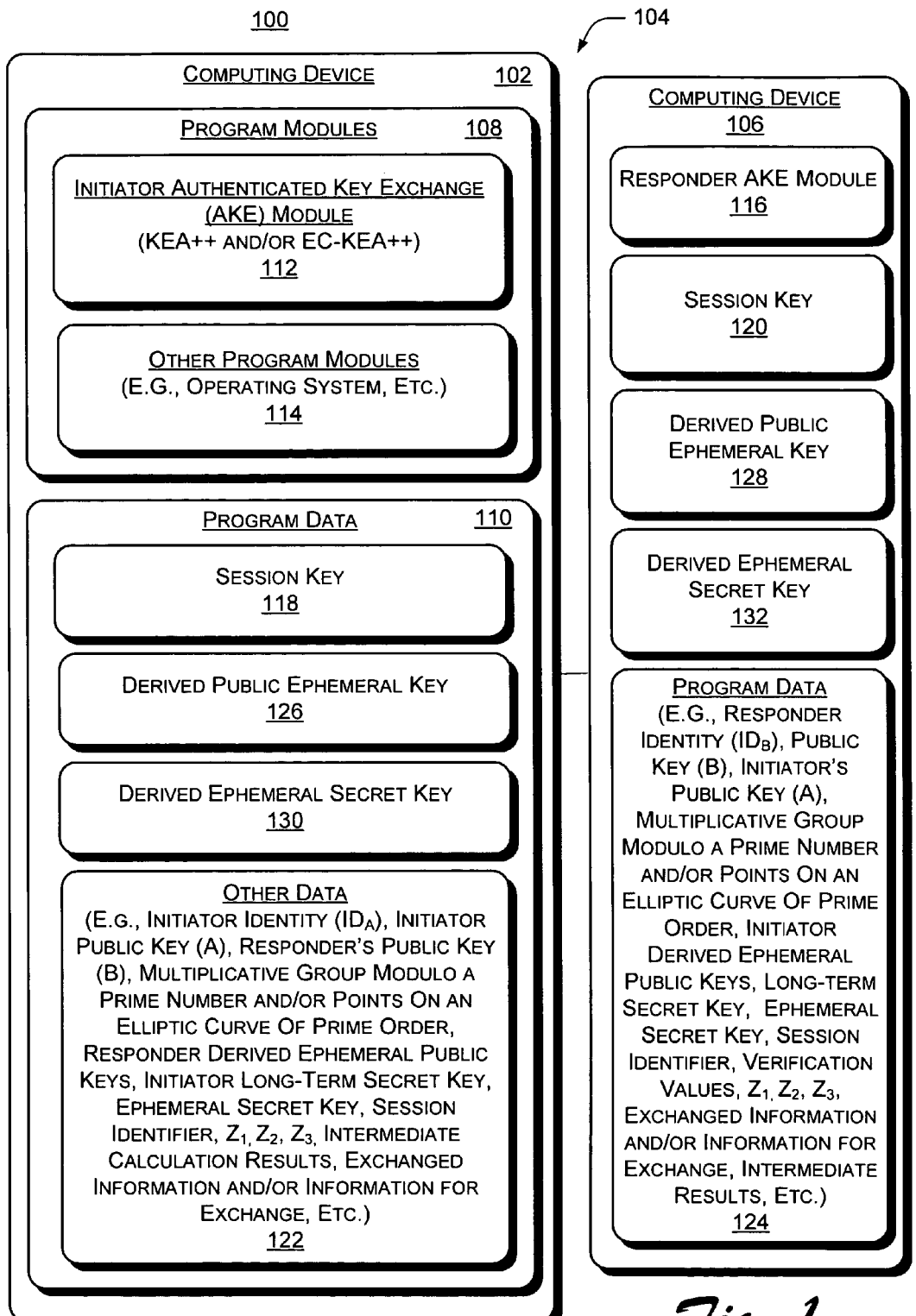
FIG. 1 shows an exemplary system for AKE with derived ephemeral keys, according to one embodiment.

FIG. 1 shows an exemplary system 100 for AKE with derived ephemeral keys. In this implementation, system 100 includes a general purpose computing device 102 coupled over network 104 to another general-purpose computing device 106. Computing devices 102 and 106 represent any type of computing device such as a personal computer, a laptop, a server, handheld or mobile computing device (e.g., a cellular phone, personal digital assistant), etc. Computing device 102 includes program modules 108 and program data 110 to implement initiator operations of AKE with derived ephemeral keys. For example, program modules 108 include, for example, initiator AKE module 112 and other program modules 114 such as an operating system, etc. Computing device 106 also includes program modules and program data to implement responder operations of AKE with derived ephemeral keys. For example, computing device 106 includes responder AKE module 116.

Both initiator and responder AKE modules 112 and 116 respectively implement KEA++ and/or EC-KEA++ operations. KEA++ operations are directed to AKE with derived ephemeral keys using a group of natural numbers modulo a fixed prime number to allow the two parties (i.e., an initiator and a responder) to determine respective agreed secret session keys (i.e., session keys 118 and 120). Session key 118 represents a session key determined by the initiator, and session key 120 represents a session key determined by the responder (these keys will be equal if the protocol is properly executed). EC-KEA++ AKE with derived ephemeral keys operations are executed in a group of points on an elliptic curve of prime order to determine respective agreed secret session keys. In both KEA++ and EC-KEA++, each party demonstrates possession and use of a respective long-term secret key to generate respective ones of the agreed secret session keys. The determined session keys 118 and 120 allow the initiator and responder to exchange information securely with one another over network 104 (e.g. a public channel).

KEA++ and EC-KEA++ protocols assume that the two parties have respective identities (initiator and responder identities) and public keys registered with a certificate of authority. Techniques to register identities and public keys with a certificate authority are well known. For purposes of exemplary illustration, initiator and responder identities ($ID_A$ and $ID_B$), as well as initiator and responder public keys (A and B), are shown as respective portions of data 122 and 124.

We now describe exemplary KEA++ operations with respect to TABLE 1. (Exemplary EC-KEA++ operations are described in greater detail below with respect to TABLE 2).

TABLE 1

EXEMPLARY OPERATIONS FOR KEA++

| Initiator (e.g., computer 102) | Responder (e.g., computer 106) |
|---|---|
| Identity: $ID_A$ | Identity: $ID_B$ |
| Secret key: a from [1...q−1] | Secret key: b from [1...q−1] |
| q prime factor of p-1 | q prime factor of p-1 |
| Public key: $A = g^a \bmod p$ | Public key: $B = g^b \bmod p$ |
| Responder's public key: B | Initiator's public key: A |
| Session identifier: sid | Session identifier: sid |
| Assumption: Responder's public key is valid | Assumption: Initiator's public key is valid |
| Pick x at random from [1...q−1] | |
| Compute c = H(x, a) | |
| Compute $X = g^c \bmod p$ | |
| Send X to the Responder | Receive X from Initiator |
| | Verify that $X^q = 1 \bmod p$, if "not", terminate |
| | Pick y at random from [1...q−1] |
| | Compute d = H(y, b) |
| | Compute $Y = g^d \bmod p$ |
| | Send Y to Initiator |
| Receive Y from the Responder | Compute $Z_1 = A^d \bmod p$ |
| Verify that $Y^a = 1 \bmod p$; if "not", terminate | Compute $Z_2 = X^b \bmod p$ |
| Compute $Z_1 = Y^a \bmod p$ | Compute a session key K = $H(Z_1, Z_2, ID_A, ID_B, sid)$ |
| Compute $Z_2 = B^c \bmod p$ | |
| Compute a session key K = $H(Z_1, Z_2, ID_A, ID_B, sid)$ | |

Referring to TABLE 1, the first column represents initiator operations and properties associated with computer 102 ("initiator 102"), and the second column represents responder operations/properties associated with computer 106 ("responder 106"). The setup parameters for KEA++ are as follows. The value p is a fixed prime number. The parameter q is a fixed prime number that is a divisor of p−1. The value g is an element from [1 ... p−1], which has order q; the powers of g can be viewed as a subgroup of order q of the multiplicative group [1 ... p−1], H is an arbitrary standard cryptographic hash function used to map all possible binary strings to binary strings of a fixed length. Identities $ID_A$ and $ID_B$ are arbitrary binary strings comprising, for example, the names of the respective parties, addresses, and/or any other type of context information. Each of these setup parameters is represented by respective portions of other data 122. Techniques to obtain and/or generate these setup parameters are well known.

As shown in TABLE 1, the initiator 102 utilizes secret key a; the responder 106 utilizes secret key b. Each of the initiator and the responder maintains a respective public key that has been registered with a certificate authority (not shown). For example, the initiator 102 uses public key $A=g^a$, and the responder 106 uses public key $B=g^b$. At this point, it is assumed that the initiator's and responder's public keys are valid, meaning that they are elements from [1, ... p−1] which are of order q. This validity property can be checked by raising a public key to the power q to determine if the output is 1 modulo p. Each communicating party knows the other respective party's public key. That is, the initiator 102 has the responder's public key, and the responder 106 has the initiator's public key.

The session identifier sid should be different for each respective session between the initiator 102 and the responder 106. The value of the session identifier is arbitrary, being a function of the particular implementation utilized to generate the session identifier.

KEA++ begins with the generation and exchange between the initiator 102 and responder 106 of respective derived ephemeral public keys X 126 and Y 128. In general, an ephemeral secret key is a random number. A conventional ephemeral public key is a number g which is a generator of the group G (i.e., $g^x$ mod). In contrast to a conventional ephemeral public key, to generate the initiator ephemeral public key X, the initiator 102 randomly selects an exponent x (the initiator's ephemeral secret key) from [1 ... q−1]. The initiator 102 then computes a derived ephemeral secret key c 130 by hashing the ephemeral secret key x with secret key a. The initiator 102 then utilizes the derived ephemeral secret key c to generate the derived ephemeral public key X. More particularly, ephemeral public key X is computed by raising the generator of the group g to the power c modulo p. The initiator 102 sends the ephemeral public key X to the responder 106.

Responsive to receiving the initiator's ephemeral public key X, the responder 106 verifies that X is valid by raising X to the power of q to determine whether the result is the identity element of the group, which is 1 modulo p. If this validity check fails, the responder 106 terminates the KEA++ protocol. If the initiator ephemeral public key X is determined to be valid, the responder 106 calculates derived ephemeral public key Y 128 as follows. Responder 106 computes a derived ephemeral secret key d 132 by hashing the ephemeral secret key y with secret key b. Responder 106 then utilizes the derived ephemeral secret key d to generate derived ephemeral public key Y. More particularly, ephemeral public key Y is computed by raising the generator of the group g to the power d modulo p. Responder 106 sends the ephemeral public key Y to the initiator.

Responsive to receiving the responder's ephemeral public key Y, the initiator 102 verifies the validity of the responder's ephemeral public key. The initiator 102 accomplishes this by raising Y to the power of q to determine whether the result is the identity element of the group, which is 1 modulo p. If this validity check fails, the initiator 102 terminates the KEA++ protocol.

At this point, assuming that the ephemeral public keys X and Y have been validated, each respective party computes a respective session key (e.g., session keys 118 and 120) based on its own secret information and information known about the other party. Such secret information includes the respective derived ephemeral secret keys, exchanged derived ephemeral public keys X and Y and the respective identities of the parties (i.e., $ID_A$ and $ID_B$). For instance, the initiator 102 raises Y to the power a, which is the secret key associated with the initiator 102, to obtain a number $Z_1$ from the group. Next, the initiator 102 computes another number from the group, $Z_2$, by raising the public key of the responder (B) to the power of c, which is the derived ephemeral secret key of the initiator 102. The initiator 102 computes a session key K (e.g., session key 118) by hashing the concatenation of the following five values: $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$. This is in contrast to conventional AKE protocols, which generate a session secret key as a hash of only $Z_1+Z_2$ (here, "+" stands for the XOR operation).

The responder 106 computes a session key K (i.e., session key 120) by raising the public key of the initiator (A) to the responder's derived secret ephemeral key d to obtain a number $Z_1$ in the group. The responder 106 computes another number in the group, $Z_2$, by raising the initiator's ephemeral public key X to the power of b, which is the secret key maintained by the responder 106. The responder 106 computes the session key K by hashing a concatenation of the five values $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$.

The computed session keys 118 and 120 will be equal if the protocol is properly executed. For the session key is to be equal, each respective party needs to demonstrate possession and use of their respective secret key (i.e., a or b). If the session keys are equal, the initiator 102 and the responder 106 can securely exchange information. For purposes of exemplary illustration, respective portions of data 122 and 124 represent securely exchanged information and/or information for secure exchange.

KEA++ with Protection Against Revelation of Long-Term Secret Keys

In one embodiment, referring to TABLE 1 where one or both parties implementing KEA++ have validated the other party's derived ephemeral public key (X or Y), a party generates a respective session key (e.g., session key 118 or 120) such that for the respective session key to be valid, each party has to have knowledge of its own derived ephemeral secret key. To this end, the party computes an additional value $Z_3$ (i.e., a 'derived ephemeral Diffie-Hellman value") based on the other party's derived ephemeral public key (126 or 128) and the party's own derived ephemeral secret key (130 or 132). This additional value is hashed along with $Z_1$, $Z_2$, $ID_A$, $ID_B$, and sid to compute the respective session key. That is in the session key is computed based on $Z_1$, $Z_2$, $Z_3$, $ID_A$, $ID_B$, and sid. For example, the initiator 102 calculates $Z_3=Y^c$ mod p, which is then used to generate session key 118. The responder 106 calculates $Z_3=X^d$ mod p, which is then used to generate session key 120. By generating the session keys in this manner, each party has to demonstrate possession of at least its own ephemeral secret key.

EC-KEA++

We now describe exemplary operations for EC-KEA++, which is an elliptic curve based AKE protocol with derived ephemeral keys, in reference to TABLE 2.

TABLE 2

EXEMPLARY OPERATIONS FOR EC-KEA++

| Initiator | Responder |
|---|---|
| Identity: $ID_A$ | Identity: $ID_B$ |
| Secret key: a from [1...q−1] | Secret key: b from [1...q−1] |
| Public key: A = aP | Public key: B = bP |
| Responder's public key: B | Initiator's public key: A |
| Session identifier: sid | Session identifier: sid |
| Assumption: Responder's | Assumption: Initiator's |

TABLE 2-continued

EXEMPLARY OPERATIONS FOR EC-KEA++

| Initiator | Responder |
|---|---|
| public key is valid | public key is valid |
| Pick x at random from [1...q−1] | |
| Compute c = H(x, a) | |
| Compute X = cP | |
| Send X to the Responder | Receive X from Initiator |
| | Verify that X is in G; if "not", terminate |
| | Pick y at random from [1...q−1] |
| | Compute d = H(x, b) |
| | Compute Y = dP |
| Receive Y from the Responder | Send Y to Initiator |
| Verify that Y is in G; if "not", terminate | |
| Compute $Z_1$ = aY | Compute $Z_1$ = dA |
| Compute $Z_2$ = cB | Compute $Z_2$ = bX |
| | Compute a session key K = H($Z_1$, $Z_2$, $ID_A$, $ID_B$, sid) |
| Compute a session key K = H($Z_1$, $Z_2$, $ID_A$, $ID_B$, sid) | |

Referring to TABLE 2, the first column represents operations and properties associated with computer 102 (i.e., "initiator 102"), and the second column represents operations and properties associated with computer 106 (i.e., responder 106). The setup parameters for EC-KEA++, are as follows. G is a group of points on an elliptic curve E of prime order. The elliptic curve is specified by an equation $y^2=x^3+ax+b$. The group of points on the elliptic curve consists of ordered pairs (x, y) that satisfy this elliptic curve equation, and the identity, a point at infinity. EC-KEA++ implements scalar multiplication in an elliptic curve group (i.e., the group operation is addition of points), rather than exponentiation operations such as those described above with respect to the KEA++ protocol. The value q is a prime number, which represents the order, or size, of the group G. The value P is an element from G, which has order q, and H is an arbitrary cryptographic hash function. For purposes of exemplary illustration, respective portions of data 122 and 124 represent these EC-KEA++ setup parameters. Techniques to obtain and/or generate such setup parameters are well known.

As shown in TABLE 2, each party (the initiator and the responder) has its own long-term secret key (a or b), which is an exponent from [1 . . . q−1], wherein q is the size of the group G. For example, the initiator has secret key a, and the responder has secret key b. Each party has its own public key (respectively, A or B) registered with a certificate authority. The initiator 102 uses public key A, and the responder 106 uses public key B. At this point, the operations of EC-KEA++ assume that the public keys are valid, meaning that they are valid points on the specified elliptic curve. Additionally, each party has access to (i.e. knows) the other respective party's public key. That is, the initiator 102 has the responder's public key, and the responder 106 has the initiator's public key.

The session identifier sid should be different for each respective session between the initiator 102 and the responder 106. The value of the session identifier is arbitrary, being a function of the particular implementation utilized to generate the session identifier.

EC-KEA++ begins with the generation and exchange between the initiator 102 and responder 106 of respective ephemeral public keys X 126 and Y 128. More particularly, the initiator 102 begins the KEA++ protocol by randomly selecting a scalar multiple x, the initiator's ephemeral secret key, from [1 . . . q−1]. Initiator 102 then computes a derived ephemeral secret key c 130 by hashing the ephemeral secret key x with secret key a. The initiator 102 then computes an ephemeral public key X by adding P to itself c times. The initiator 102 sends the derived ephemeral public key X to the responder 106.

Responsive to receiving the initiator's derived ephemeral public key X, the responder 106 verifies that X is valid by verifying that X is in G. If this validity check fails, the responder 106 terminates the EC-KEA++ protocol. If the initiator's ephemeral public key is determined to be valid, the responder 106 picks a responder secret ephemeral key y at random and computes the corresponding responder derived ephemeral public key Y, as shown in TABLE 2. The responder 106 sends the derived ephemeral public key Y to the initiator 102.

Responsive to receiving the responder's derived ephemeral public key Y, the initiator 102 verifies the validity Y by verifying that Y is in G. If this validity check fails, the initiator 102 terminates the EC-KEA++ protocol. If both the ephemeral public keys X and Y are valid, each respective party 102 and 106 computes a session key K (i.e., session keys 118 and 120) based on its own secret information and information known about the other party. Such information includes the exchanged derived ephemeral public keys X and Y, and the respective identities of the parties (i.e., $ID_A$ and $ID_B$). For instance, the initiator 102 adds the ephemeral public key received from the responder (Y) to itself a times to calculate a point $Z_1$. Next, the initiator 102 computes another point in G, $Z_2$, by adding the public key of the responder (B) to itself c times. The initiator 102 computes a session key K (e.g., session key 118) by hashing the concatenation of the following five values: $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$.

The responder 106 computes the session key K (session key 120) by adding the public key of the initiator (A) to itself d times to obtain a point $Z_1$ in G. The responder 106 than computes another point in G, $Z_2$, by adding the initiator's ephemeral public key X to itself b times. The responder 106 computes the session key K by hashing a concatenation of the five values $Z_1$, $Z_2$, $ID_A$, $ID_B$, and sid. In one implementation, the session key is determined by hashing only a subset of the above-indicated five values, for example only $Z_1$, $Z_2$, $ID_A$, $ID_B$.

Using the session keys 118 and 120 (which are supposed to be equal) determined with the above described EC-KEA++ operations, the initiator 102 in the responder 106 can securely exchange information. For purposes of exemplary illustration, respective portions of data 122 and 124 represent securely exchanged information and/or information for secure exchange.

EC-KEA++ with Protection Against Revelation of Long-Term Secret Keys

In one embodiment, referring to TABLE 2 where one or both parties implementing EC-KEA++ have validated the other party's derived ephemeral public key (X or Y), a party generates a respective session key (e.g., session key 118 or 120) such that for the respective session key to be valid, each party has to have knowledge of its own derived ephemeral secret key. To this end, the party computes an additional value $Z_3$ (i.e., a 'derived ephemeral Diffie-Hellman value") based on the other party's derived ephemeral public key (126 or 128) and the party's own derived ephemeral secret key (130 or 132). This additional value is hashed along with $Z_1$, $Z_2$, $ID_A$, $ID_B$, and sid to compute the respective session key. That is in the session key is computed based on $Z_1$, $Z_2$, $Z_3$, $ID_A$, $ID_B$, and sid. For example, the initiator 102 calculates $Z_3=cY$, which is then used to generate session key 118. The responder 106 calculates $Z_3=dX$, which is then used to generate session key 120. By generating the session keys in this manner, each party has to demonstrate possession of at least its own ephemeral secret key.

Exemplary Procedure

Figure 2:
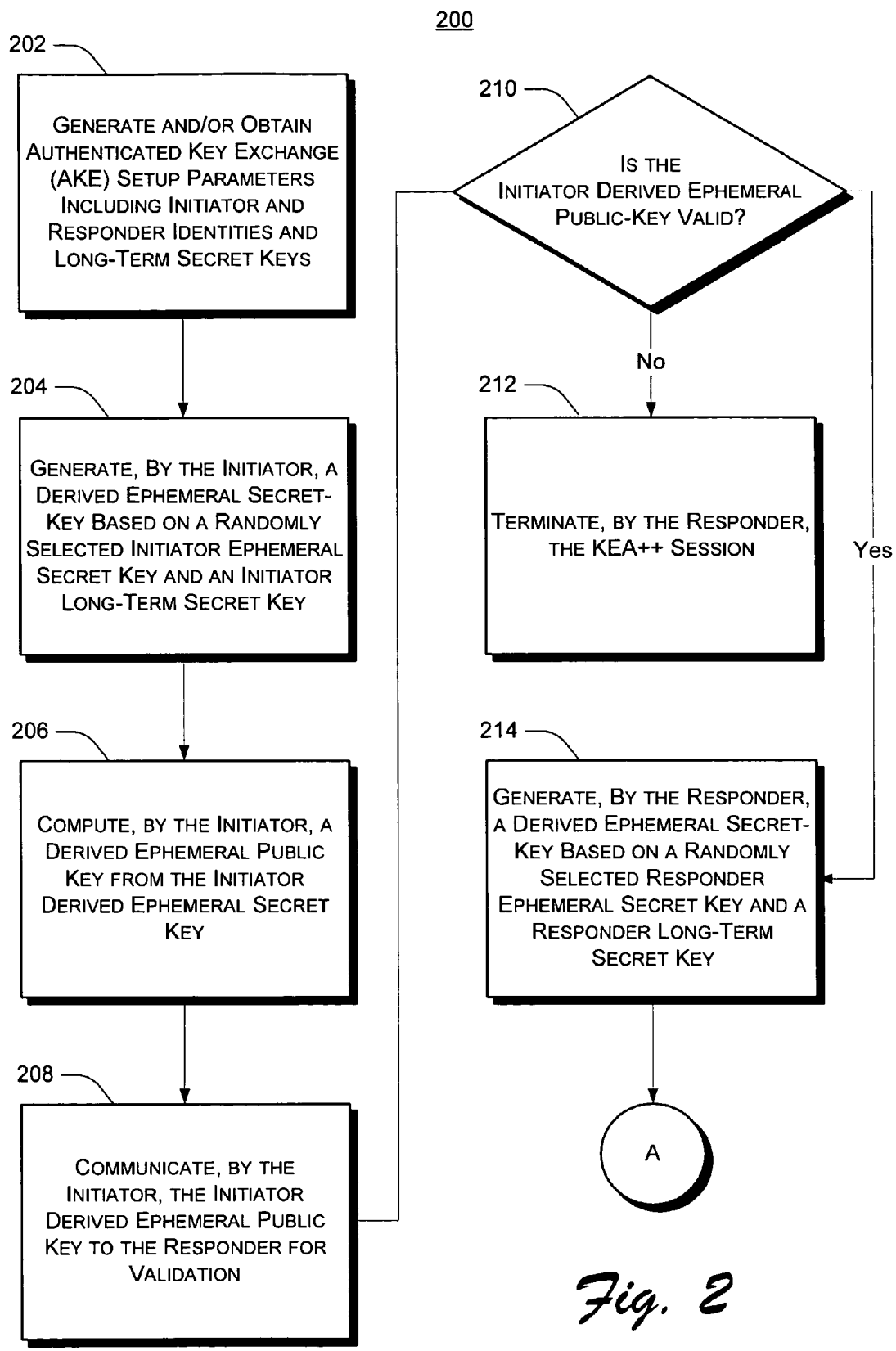
FIG. 2 shows an exemplary procedure for AKE with derived ephemeral keys, according to one embodiment.

FIG. 2 shows an exemplary procedure 200 for AKE with derived ephemeral keys, according to one embodiment. For purposes of discussion and exemplary illustration, operations of this procedure are described with respect to components of FIG. 1. The left-most digit of a component reference number identifies the particular figure in which the component first appears. Various changes and modifications may become apparent to those skilled in the art from the present description, including changes and modifications to the order of operations of procedure 200. In this implementation, system 100 of FIG. 1 implements operations of procedure 200.

At block 202, AKE program modules 112 (FIG. 1) and 116, which are respectively associated with an initiator and a responder, generate or otherwise obtain setup parameters to implement AKE with derived ephemeral keys. The setup parameters associated with KEA++ operations are for using a group of natural numbers modulo a fixed prime number. The setup parameters associated with EC-KEA++ operations are for operations using a group of points on elliptic curve of prime order. In both scenarios, the setup parameters include the initiator and responder identities and respective long-term secret keys.

At block 204, the initiator 102 generates a derived ephemeral secret key 130 ("initiator derived ephemeral secret key"). In one implementation, this is accomplished by generating a randomly selected ephemeral secret key. The randomly selected ephemeral secret key is hashed along with the initiator's long-term secret key to produce the derived initiator ephemeral secret key. At block 206, the initiator computes a derived ephemeral public key 126 ("initiator derived ephemeral public key"). In one implementation, this is accomplished as a function of the derived initiator ephemeral secret key and a group of numbers (i.e., KEA++) or a group of points (i.e., EC-KEA++). At block 208, the initiator 102 communicates the initiator derived ephemeral public key to the responder for validation.

At block 210, the responder 106 determines whether the received initiator derived ephemeral public key 126 is valid. If not, at block 212, the responder 106 terminates the AKE session with the initiator. Otherwise, if the received initiator derived ephemeral public key is valid, operations continue at block 214. At block 214, the responder generates a derived ephemeral public key 128 ("responder derived ephemeral public key"). In one implementation, this is accomplished by hashing a randomly selected responder ephemeral secret key and the responder's long-term secret key (e.g., see TABLE 1, b). At this point, the operations of procedure 200 continue on FIG. 3, on page reference "A."

Figure 3:
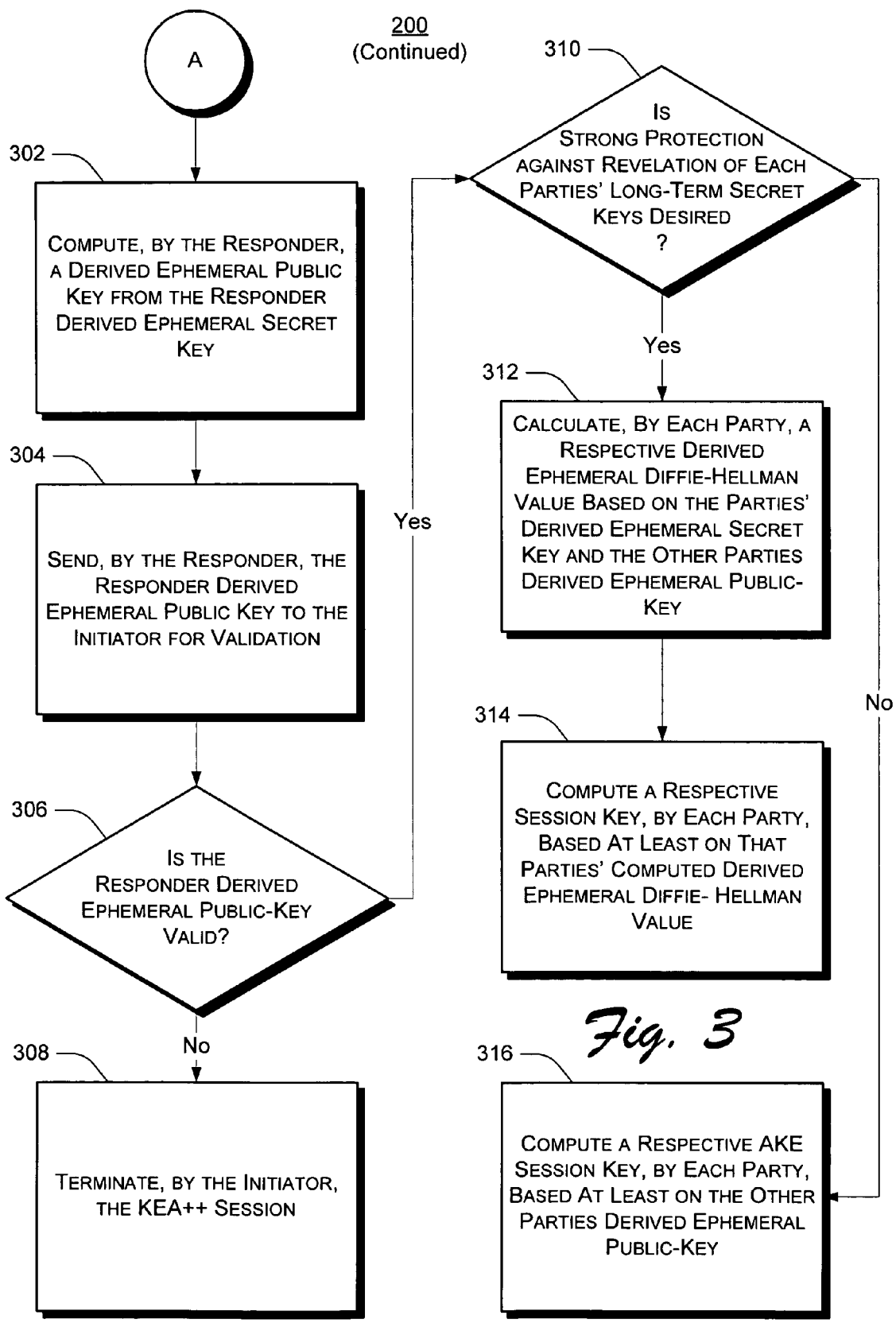
FIG. 3 shows an exemplary procedure for AKE with derived ephemeral keys, according to one embodiment. More particularly, operations of the exemplary procedure shown in FIG. 3 are a continuation of the operations of FIG. 2.

FIG. 3 shows exemplary operations for AKE with derived ephemeral keys, according to one embodiment. The operations of FIG. 3 are a continuation of the procedure 200 of FIG. 2. At block 302, the responder 106 (FIG. 1) computes a derived ephemeral public key 128 ("responder derived ephemeral public key"). This computation is based on the responder derived ephemeral secret key determined above in block 214 of FIG. 2. At block 304, the responder sends the responder derived ephemeral secret key to the initiator 102 for validation.

At block 306, the initiator 102 evaluates the responder derived ephemeral public key (i.e., "derived public ephemeral key 128" of FIG. 1) to determine whether the key is valid. If the responder derived ephemeral public key key is not valid, the operations of the AKE session are terminated by the initiator at block 308. If the responder derived ephemeral public key is valid, the operations continue at block 310.

At block 310, both the initiator 102 and the responder 106 determine whether strong protection against revelation of each party's long-term secret key is desired. If so, at block 314, each party calculates a respective derived ephemeral Diffie-Hellman value using that particular party's derived ephemeral secret key (i.e., key 130 or key 132) and the other party's derived ephemeral public key (i.e., key 126 or key 128). More particularly, the operations of block 312 implement a Diffie-Hellman key agreement with the two derived ephemeral secret keys to generate the respective derived ephemeral Diffie-Hellman values (e.g., see values $Z_3$ in the sections titled "KEA++ with Protection against Revelation of Long-Term Secret Keys" and "EC-KEA++ with Protection against Revelation of Long-Term Secret Keys"). At block 314, each party computes a respective session key (i.e., session key 118 or session key 120) based at least on that particular party's computed derived ephemeral Diffie-Hellman value.

If the initiator 102 and the responder 106, at block 310, determine that additional protection against revelation of each party's long-term secret key is not desired, the operations of procedure 200 continue at block 316. At block 316, both the initiator and the responder compute a respective session key (i.e., session keys 118 or 120) based at least on the other parties' derived ephemeral public key (i.e., Keys 126 and 128).

In one implementation, the session keys 118 and 120 generated by operations of blocks 314 or 316 are also generated based on authenticated identities of each of the initiator 102 and the responder 106.

An Exemplary Operating Environment

Figure 4:
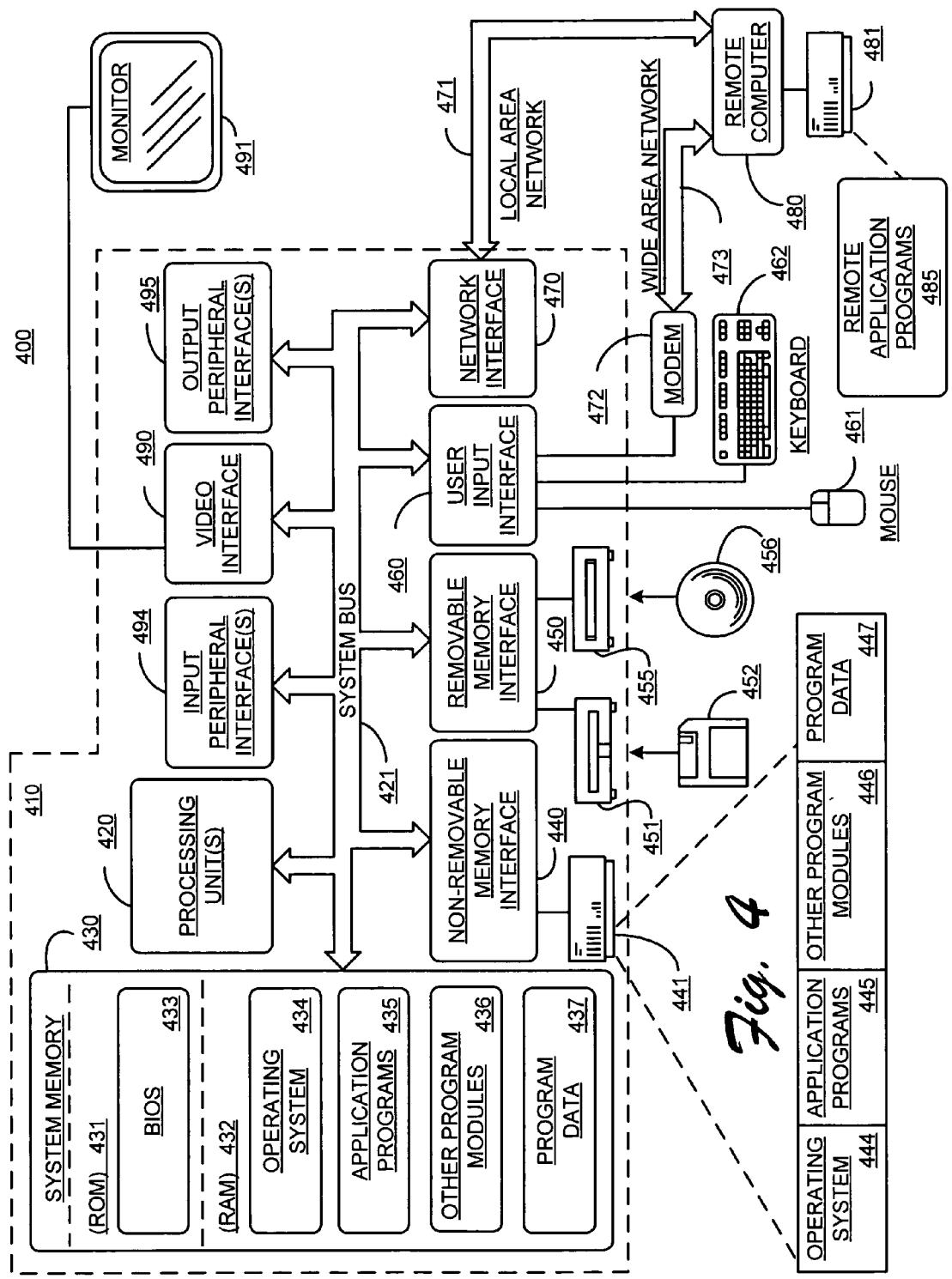
FIG. 4 illustrates an example of a suitable computing environment for implementing (fully or partially) AKE with derived ephemeral keys, according to one embodiment.

FIG. 4 illustrates an example of a suitable computing environment in which AKE with derived ephemeral keys may be fully or partially implemented. Exemplary computing environment 400 is only one example of a suitable computing environment for the exemplary system 100 of FIG. 1 and exemplary operations of FIGS. 2 and 3, and is not intended to suggest any limitation as to the scope of use or functionality of systems and methods the described herein. Neither should computing environment 400 be interpreted as having any dependency or requirement relating to any one or combination of components illustrated in computing environment 400.

The methods and systems described herein are operational with numerous other general purpose or special purpose computing system, environments or configurations. Examples of well-known computing systems, environments, and/or configurations that may be suitable for use include, but are not limited to personal computers, server computers, multiprocessor systems, microprocessor-based systems, network PCs, minicomputers, mainframe computers, distributed computing environments that include any of the above systems or devices, and so on. Compact or subset versions of the framework may also be implemented in clients of limited resources, such as handheld computers, or other computing devices. The invention is practiced in a networked computing environment where tasks are performed by remote processing devices that are linked through a communications network.

With reference to FIG. 4, an exemplary system providing AKE with derived ephemeral keys includes a general-purpose computing device in the form of a computer 410 implementing, for example, initiator operations associated with computing device 102 of FIG. 1 or operations of responder 106. Components of computer 410 may include, but are not limited to, processing unit(s) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example and not limitation, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

A computer 410 typically includes a variety of computer-readable media. Computer-readable media can be any available media that can be accessed by computer 410, including both volatile and nonvolatile media, removable and non-removable media. By way of example, and not limitation, computer-readable media may comprise computer storage media and/or communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other non-transmission medium that can be used to store the desired information for access by computer 410. In contrast, communication media may embody computer readable instructions, data structures, program modules, or other data in a modulated data signal, such as a carrier wave, or other transmission mechanism. As defined herein, computer storage media does not include communication media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone, joystick, graphics pen and pad, satellite dish, scanner, etc. These and other input devices are often connected to the processing unit 420 through a user input interface 460 that is coupled to the system bus 421, but may be connected by other interface and bus structures, such as a parallel port, game port or a universal serial bus (USB). In this implementation, a monitor 491 or other type of user interface device is also connected to the system bus 421 via an interface, for example, such as a video interface 490.

The computer 410 operates in a networked environment using logical connections to one or more remote computers, such as a remote computer 480. In one implementation, remote computer 480 represents computing device 102 or 106 of FIG. 1. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

Conclusion

Although the above sections describe AKE with derived ephemeral keys in language specific to structural features and/or methodological operations or actions, the implementations defined in the appended claims are not necessarily limited to the specific features or actions described. Rather, the specific features and operations of system 100 (FIG. 1) and procedure 200 (FIGS. 2 and 3) are disclosed as exemplary forms of implementing the claimed subject matter.

The invention claimed is:

1. A computer-implemented method of authenticated key exchange (AKE) using a mathematical group, the method comprising:

obtaining parameters implementing AKE between an initiator computing device and a responder computing device connected via a network;

computing, by the initiator computing device, a derived ephemeral public-key based at least on a derived ephemeral secret key and the mathematical group, the derived ephemeral secret key being based at least on hashing a randomly selected ephemeral secret key and a long-term secret key;

communicating, by the initiator computing device, the derived ephemeral public-key to the responder computing device for validation; and responsive to validation of the derived ephemeral public key of the initiator computing device, generating, by the initiator computing device, a session key for secure exchange of information with the responder computing device, the session key being generated using the initiator computing device's derived ephemeral secret key and the responder computing device derived ephemeral public-key.

2. A method as recited in claim 1, wherein the mathematical group is a subgroup of a multiplicative group of natural numbers modulo a prime number.

3. A method as recited in claim 1, wherein the mathematical group is a subgroup of the group of points on an elliptic curve.

4. A method as recited in claim 1, wherein operations associated with the computing and the generating comprise modular exponentiation using the mathematical group or scalar multiplication in elliptic curve groups of the mathematical group.

5. A method as recited in claim 1, wherein the responder computing device derived ephemeral public-key key is based at least on a responder computing device derived ephemeral secret key, the responder computing device derived ephemeral secret key being generated using a long-term secret key of the responder computing device and a randomly selected responder computing device ephemeral secret key.

6. A method as recited in claim 1, wherein generating the session key further comprises calculating the session key using authenticated identities of the initiator computing device and the responder computing device.

7. A method as recited in claim 1, wherein generating the session key further comprises calculating the session key based at least on a session identifier.

8. A method as recited in claim 1, further comprising:

communicating, by the initiator computing device, the derived ephemeral public-key to the responder computing device for continuing or terminating the AKE, by the responder computing device, based at least on whether the derived ephemeral public-key is validated with respect to the mathematical group.

9. A method as recited in claim 1, wherein generating the session key further comprises:
   determining a derived ephemeral Diffie-Hellman value based at least on the responder computing device derived ephemeral public-key and the derived ephemeral secret key; and
   calculating the session key using the derived ephemeral Diffie-Hellman value.

10. A method as recited in claim 9, wherein operations associated with determining the derived ephemeral Diffie-Hellman value implement Diffie-Hellman key agreement using derived ephemeral secret keys associated with each of the initiator computing device and the responder computing device.

11. A computer-implemented method for authenticated key exchange (AKE) using a mathematical group, the method comprising:
   obtaining parameters implementing AKE between an initiator computing device and a responder computing device connected via a network;
   receiving, by the initiator computing device, a derived ephemeral public-key from the responder computing device, the derived ephemeral public-key being generated from a responder computing device derived ephemeral secret key, the responder computing device derived ephemeral secret key being based at least on hashing a randomly selected ephemeral secret key and a long-term secret key of the responder computing device;
   validating the derived ephemeral public-key for membership in the mathematical group;
   in an event the derived ephemeral public-key is valid, computing, by the initiator computing device, a session key for secure exchange of information with the responder computing device, the session key being generated using an initiator computing device derived ephemeral secret key and the derived ephemeral public-key from the responder computing device; and
   in an event the derived ephemeral public key is not valid, terminating, by the initiator computing device, the AKE.

12. A method as recited in claim 11, wherein the mathematical group is a subgroup of a multiplicative group of natural numbers modulo a prime number.

13. A method as recited in claim 11, wherein the mathematical group is a subgroup of the group of points on an elliptic curve.

14. A method as recited in claim 11, wherein computing the session key further comprises calculating the session key using authenticated identities of the initiator computing device and the responder computing device.

15. A method as recited in claim 11, wherein computing the session key further comprises:
   determining a derived ephemeral Diffie-Hellman value based at least on the derived ephemeral public-key from the responder computing device, the initiator computing device derived ephemeral secret key, and the mathematical group; and
   calculating the session key using the derived ephemeral Diffie-Hellman value.

16. A method as recited in claim 15, wherein operations associated with determining the derived ephemeral Diffie-Hellman value implement Diffie-Hellman key agreement using derived ephemeral secret keys associated with each of the initiator computing device and the responder computing device.

17. A computer-implemented method for authenticated key exchange (AKE) using a mathematical group, the method comprising:
   receiving, by a responder, an initiator derived ephemeral public-key, the initiator derived ephemeral public-key computed from an initiator derived ephemeral secret key based at least on hashing an initiator long-term secret key and a randomly selected initiator secret ephemeral key;
   determining, by the responder, the validity of the received initiator derived ephemeral public-key in view of the mathematical group;
   responsive to the determining the initiator derived ephemeral public-key is not valid by the responder in view of the mathematical group, terminating the AKE;
   responsive to the determining the initiator derived ephemeral public-key is valid by the responder in view of the mathematical group:
      generating, by the responder, a responder derived ephemeral public-key from a responder derived ephemeral secret key that is based at least on hashing a responder long-term secret key and a responder secret ephemeral key;
      generating, by the responder, a first session key based at least on the initiator derived ephemeral public-key and the responder derived ephemeral secret key;
      sending, by the responder, the responder derived ephemeral public-key to the initiator for validation in view of the mathematical group;
      responsive to the determining the responder derived ephemeral public-key is not valid in view of the mathematical group, terminating the AKE; and
      responsive to the determining the responder derived ephemeral public-key is valid in view of the mathematical group:
         generating, a second session key based at least on the responder derived ephemeral public-key and the initiator derived ephemeral secret key, wherein the first session key and the second session key are used by respective ones of the initiator and the responder to exchange information securely over a network.

18. One or more computer storage media storing computer-executable instructions that when executed by a processor, perform the method of claim 1.

19. One or more computer storage media storing computer-executable instructions that when executed by a processor, perform the method of claim 11.

20. One or more computer storage media storing computer-executable instructions that when executed by a processor, perform the method of claim 17.

* * * * *